May 15, 1956  A. BERGSON  2,746,007

TRANSIENT CONTROL RELAY

Filed Sept. 17, 1952

INVENTOR.
ARNOLD BERGSON

BY

ATTORNEY

United States Patent Office 2,746,007
Patented May 15, 1956

2,746,007
TRANSIENT CONTROL RELAY

Arnold Bergson, Cleveland, Ohio, assignor to Jack & Heintz, Inc., Cleveland, Ohio, a corporation of Delaware Application September 17, 1952, Serial No. 310,081

3 Claims. (Cl. 322—76)

This invention relates in general to electrical regulating systems.

Conventional design conditions imposed upon such rotating electrical machines as aircraft generators, alternators, and the like, employing carbon pile voltage regulators, have been found to cause susceptibility to considerable transient over-voltage under normal switching conditions and sudden load change.

Wide speed range rotating electrical machines, such as generators and alternators, or the like, with built-in exciters give the highest transients at maximum speed upon closing the field and upon switching the load on or off. Under these conditions, residual voltage is normally at a maximum and field requirements are at minimum. During the switching transient, field current may be limited by conditions other than the voltage regulator and may rise to many times the required value causing high over-voltage transients. Systems of this type require additional control only during this transient period.

It is therefore one of the primary objects of my invention to provide a simple, efficient, light and inexpensive self-contained unit that will function as a transient control relay for obtaining this transient voltage control.

Another object is to provide such a unit that will provide the required control for sensing the characteristics of transient voltage build up that would otherwise cause over-voltage and which will act as quickly as possible in order to limit the field current to such a value that the maximum transient voltage is within predetermined required limits.

Another object is to provide a transient control unit which, as the transient voltage decreases, on each transient cycle, to the point where normal voltage control is resumed by the voltage regulator, will cut out as quickly as possible in order to permit the resumption of normal operation of the carbon pile voltage regulator in the system.

A further object is to provide such a transient control unit which will also sense the speed of the alternator, or generator, or the like, since the field current requirements for normal voltage regulation will vary over a wide range of speed variation.

Figure 1:
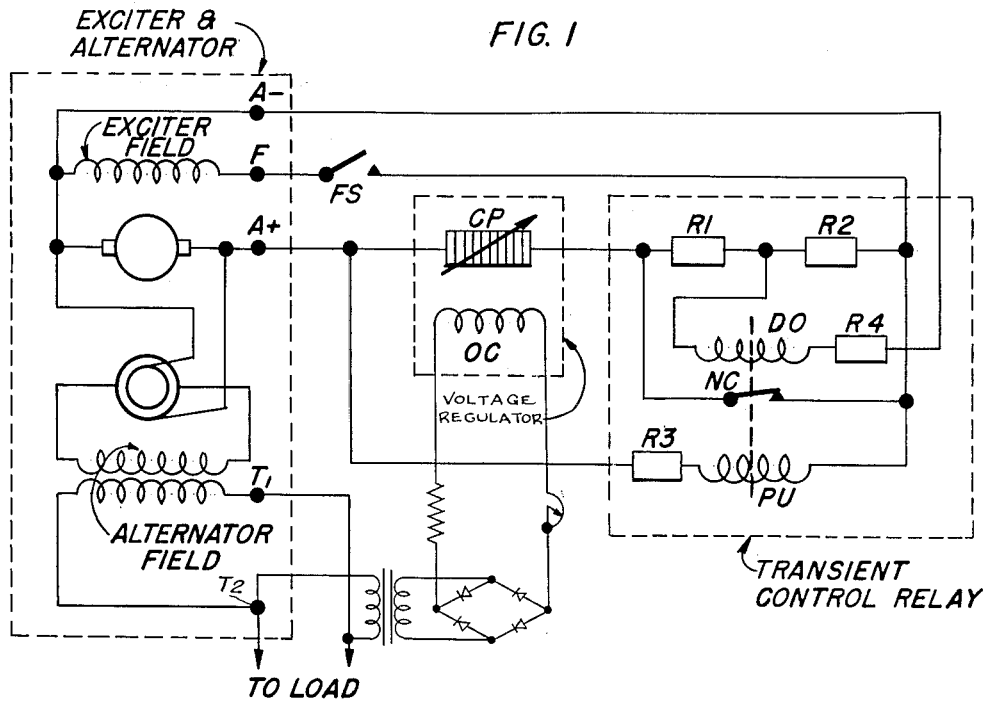
Figure 2:
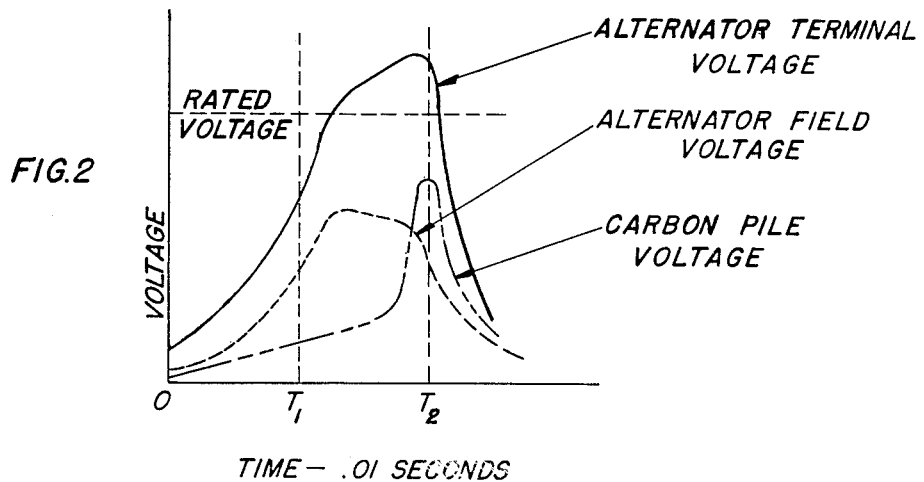

With the foregoing and other objects in view, the invention resides in the combination of parts and in the details of construction and arrangement set forth in the following specification and appended claims, certain embodiments thereof being illustrated in the accompanying drawings, in which:

Figure 1 is a wiring diagram of one form that my invention may take, in which the transient control relay includes a polarized relay with bucking coils, four resistors and an automatic switch control; and Figure 2 is a graph of the operating cycle of the system.

Referring more particularly to the drawings, Figure 1 is the schematic diagram of one form that my transient control relay may take. It is shown in use with a wide speed range, built-in exciter, with a field F, and alternator with terminals A— and A+ and a carbon pile voltage regulator including the carbon pile C. P. with the operating coil O. C. The transient control relay consists of a polarized relay having two identical operating coils, one a drop out coil D. O. and another a pickup coil P. U. These coils are connected to operate as bucking coils. I also show four resistors R1, R2, R3, and R4.

On closing the field switch F. S., at maximum speed operation of the rotating electrical machine, the carbon pile C. P. is fully compressed and its resistance is considerably lower than that of the exciter field F. Since this is a self-excited unit, the exciter starts at residual voltage and begins building up as does the alternator. The relaying circuit is designed such that the drop-out coil D. O. senses a portion of the alternator field voltage and the pickup coil P. U. senses a portion of the carbon pile voltage. When the exciter field switch is closed, the output of the exciter energizes the generator field windings. As the energization of the field windings is increased, the output of the generator will increase and the carbon pile regulator will in turn function to control the exciter and the energization of the generator field winding. However, due to the time lag in the operation of the carbon pile regulator, the alternator field will not be reduced fast enough when the generator reaches the desired output and the output will normally exceed that for which the regulator is set, giving rise to an overvoltage condition. The present invention, however, utilizes the difference in voltage conditions in the exciter field circuit and in the alternator field circuit which are indicative of the energizations of the field windings to sense the output overvoltage transients and prevent the same. Other transients such a sudden changes in load will likewise be reflected in the generator field windings and the transient control relay will similarly operate to prevent these transient overvoltages. The operating point of my transient control relay is preferably set for the minimum difference voltage corresponding to an overvoltage condition. Resistances R1 and R2 are inserted in series with the carbon pile C. P. of the voltage regulator.

Figure 2 shows an operating cycle of the system. At about 70% of rated voltage T1, the difference voltage impressed on the relay reaches the operating value and the contacts of the automatic normally closed switch N. C. are opened. Resistances R1 and R2, being in series with the carbon pile C. P. act to limit the further rise of terminal voltage, as shown in Figure 2. When the terminal voltage approaches rated value, the voltage regulator is energized and, after its operational time constant, begins to open the stack of the carbon pile C. P. This increased stack resistance causes terminal voltage to drop on the second part of the cycle.

With the net difference voltage applied to the relay having now decreased to zero and increased in the opposite polarity, as shown in Figure 2, this causes pickup coil P. U. to overpower the drop out coil D. O. to close the contacts of the automatic switch N. C. of the transient control relay. Resistances R1 and R2 are thus shorted out of the circuit, as the rated voltage is approached. This establishes the voltage regulator in full control of the system. If the system response is such that more than one transient cycle is required before steady state operation is resumed, my transient control relay will cycle in each transient cycle exceeding preset conditions. In addition to limiting the over-voltage transients, my transient control relay also speeds up system response by absorbing transient energy during each operational cycle.

Since over-voltage transient magnitude increases rapidly as speed increases, I find it preferable to make my resistance R4 as large as conveniently possible for the greatest effect at maximum speed of operation of the rotating electrical machine. This condition imposes the necessity for minimum speed selection in order to prevent operation of my transient control relay at speeds below the critical speed at which the insertion of resistance R1 would cause the terminal voltage to drop to residual voltage of the alternator, or generator, or the like. Exciter gain increases as speed increases, so that by differential sensing across the exciter the minimum operating speed may be set as desired by the magnitude of resistance R3. A more sensitive speed selection may be accomplished by using a non-linear resistance element for resistance R3.

From the foregoing, it will be seen that I have provided a simple and efficient self-contained transient control unit that will automatically sense transient over-voltage build-up, during switching conditions, and limit the field current so as to control the transient voltage within predetermined required limits; that will, as the transient voltage decreases, on each transient cycle, to the point where normal voltage control is resumed by the voltage regulator, cut out so as to re-establish the carbon pile voltage regulator as such in the system and which will also sense the speed of the rotating electrical machine and operate accordingly.

I claim:

1. In a generator, a generator field winding, an exciter for energizing said field winding including an exciter field winding, a regulator responsive to the output of the generator and including a variable resistance connected in series with said exciter field winding for controlling the output of the generator, means for comparing a voltage condition of the generator field winding circuit and a voltage condition which is dependent on the voltage drop across said variable resistance, and means responsive to the last said means for increasing the resistance in series with said exciter field winding when the difference of said voltage conditions is above a predetermined minimum.

2. In a generator, a generator field winding, an exciter for energizing said field winding including an exciter field winding including an exciter field winding, a regulator including an operating coil responsive to the output of the generator and a variable resistance connected in series with said exciter field winding for controlling the output of the generator, a relay having a first coil and second opposing operating coils, first circuit means for applying a voltage to said first coil dependent upon the voltage drop across said variable resistance, second circuit means for applying a voltage across said second coil dependent upon the voltage across said generator field winding, said relay being actuated from its normal position upon a predetermined difference in voltages applied to its operating coils, resistance means connected in circuit with said relay and connected in series with said exciter field winding upon actuation of said relay from its normal position.

3. In a generator, a generator field winding, an exciter for energizing said field winding including an exciter field winding, a regulator having an operating coil responsive to the output of said generator and a variable resistance connected in series with said exciter field winding for controlling the output of the generator, a second resistance connected in series with said variable resistance and said exciter field winding, and means for short-circuiting said second resistance in said exciter field winding circuit comprising a relay having a first relay operating coil responsive to the voltage drop across said variable resistance and a second relay operating coil responsive to the voltage drop across said generator field winding, said relay normally effectively actuating a circuit for shorting said second resistance out of said exciter field winding circuit and operating upon application of voltages to said relay operating coils having a predetermined difference in magnitude to open the short circuit for said second resistance.

References Cited in the file of this patent

UNITED STATES PATENTS

| | | |
|---|---|---|
| 1,911,074 | Fitz Gerald | May 23, 1933 |
| 2,526,133 | Haas | Oct. 17, 1950 |